(12) United States Patent
Jenkins et al.

(10) Patent No.: US 10,404,854 B2
(45) Date of Patent: Sep. 3, 2019

(54) OVERLOAD CONTROL FOR SESSION SETUPS

(71) Applicant: BRITISH TELECOMMUNICATIONS PUBLIC LIMITED COMPANY, London (GB)

(72) Inventors: Ian William George Jenkins, London (GB); Nicholas Michael Stewart, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/654,348

(22) PCT Filed: Dec. 19, 2013

(86) PCT No.: PCT/GB2013/000559
§ 371 (c)(1),
(2) Date: Jun. 19, 2015

(87) PCT Pub. No.: WO2014/096760
PCT Pub. Date: Jun. 26, 2014

(65) Prior Publication Data
US 2015/0358458 A1    Dec. 10, 2015

(30) Foreign Application Priority Data
Dec. 20, 2012  (EP) .................................... 12250184

(51) Int. Cl.
*H04M 3/36* (2006.01)
*H04M 7/00* (2006.01)
(Continued)

(52) U.S. Cl.
CPC ............ *H04M 3/367* (2013.01); *H04L 47/12* (2013.01); *H04L 65/1013* (2013.01);
(Continued)

(58) Field of Classification Search
None
See application file for complete search history.

(56) References Cited

U.S. PATENT DOCUMENTS

| 7,453,803 B1 | 11/2008 | Bugenhagen |
| 2007/0153813 A1* | 7/2007 | Terpstra ............ H04L 29/06027 370/401 |

(Continued)

FOREIGN PATENT DOCUMENTS

| EP | 2 445 164 | 4/2012 |
| GB | 2 380 894 | 4/2003 |

OTHER PUBLICATIONS

International Search Report for PCT/GB2013/000559 dated Feb. 14, 2014, three pages.

*Primary Examiner* — Adnan Baig
(74) *Attorney, Agent, or Firm* — Nixon & Vanderhye PC

(57) ABSTRACT

A centralized server system (12, 18) is arranged to monitor overload restriction requirements of session control nodes (21A-D) within a globally scalable VoIP and Multimedia network (20) in order to handle session set-up requests. An overload status module (38) in the server system receives overload status messages (22) from the session control nodes and based on these messages and the demand on each session control node determined from session set-up requests, the server system (12, 18) selects which session control nodes (21A-D) as well as which of their associated interconnects to other networks to include in a session setup response (6) to a session setup request (5) from a source session control node (21A-D).

18 Claims, 4 Drawing Sheets

Figure 1:
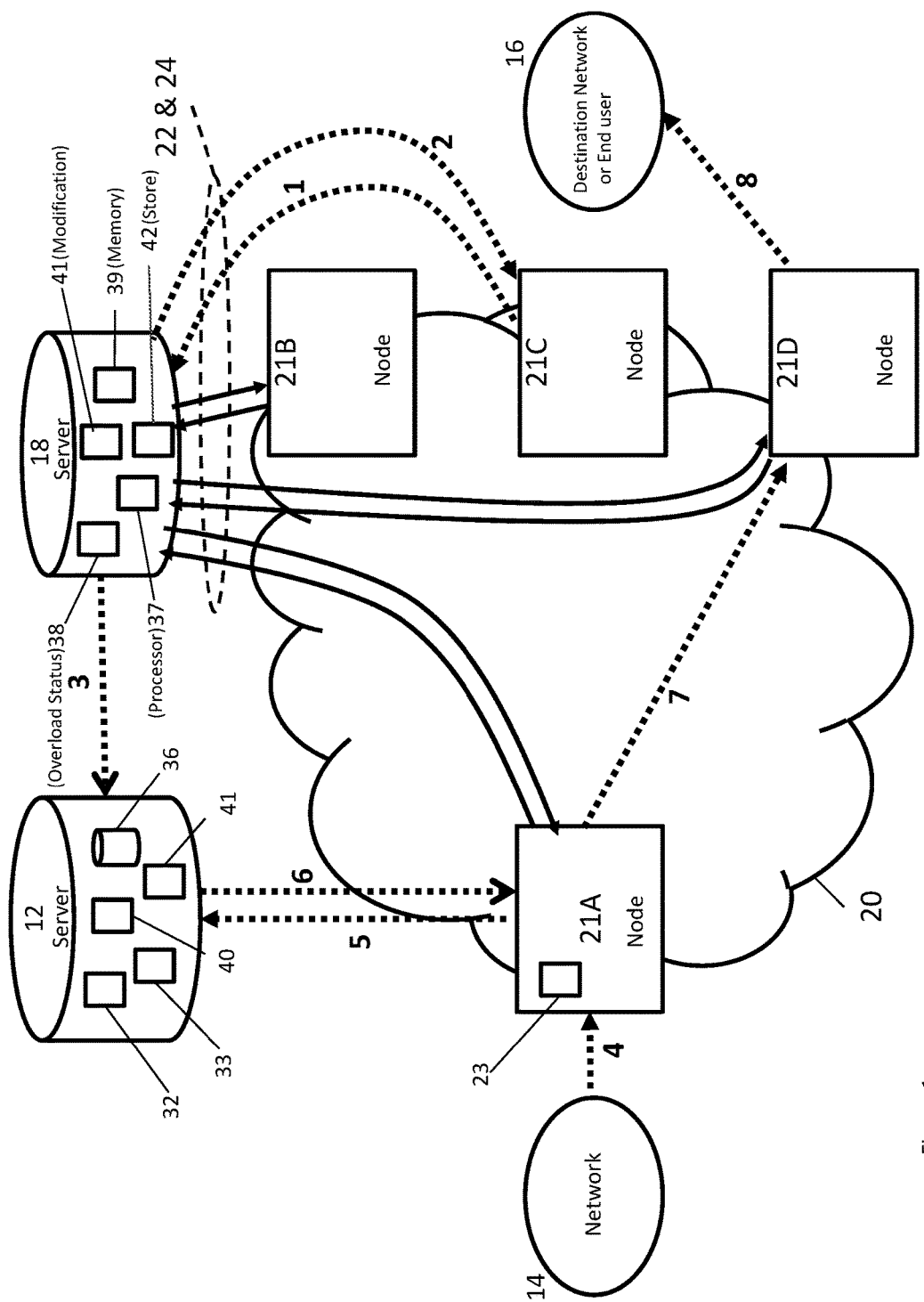

(51) Int. Cl.
*H04L 12/801* (2013.01)
*H04L 29/06* (2006.01)
*H04L 29/08* (2006.01)

(52) U.S. Cl.
CPC ...... *H04L 65/1046* (2013.01); *H04L 65/1069* (2013.01); *H04L 65/80* (2013.01); *H04L 67/14* (2013.01); *H04M 7/006* (2013.01)

(56) References Cited

U.S. PATENT DOCUMENTS

| | | | |
|---|---|---|---|
| 2008/0250156 A1 | 10/2008 | Agarwal et al. | |
| 2008/0279183 A1* | 11/2008 | Wiley | H04L 29/06027 370/389 |
| 2009/0010168 A1* | 1/2009 | Yurchenko | H04L 12/66 370/237 |
| 2009/0059895 A1* | 3/2009 | Yasrebi | H04L 12/5691 370/352 |
| 2010/0220587 A1* | 9/2010 | Kovacs | H04L 47/10 370/230 |
| 2011/0145407 A1* | 6/2011 | Pascual Avila | H04L 65/1069 709/225 |
| 2011/0202645 A1* | 8/2011 | Abdelal | G06F 11/3688 709/223 |
| 2014/0003233 A1* | 1/2014 | Rune | H04L 47/125 370/230 |

\* cited by examiner

OVERLOAD CONTROL FOR SESSION SETUPS

This application is the U.S. national phase of International Application No. PCT/GB2013/000559 filed 19 Dec. 2013 which designated the U.S. and claims priority to EP Patent Application No. 12250184.4 filed 20 Dec. 2012, the entire contents of each of which are hereby incorporated by reference.

FIELD OF INVENTION

The present invention relates to overload control in a Voice over Internet Protocol (VoIP) and multimedia session network and especially to a method and system for overload control of session establishment in transit networks connecting different service providers.

BACKGROUND OF INVENTION

In next generation VoIP and IP multimedia networks, individual control plane components, (e.g. Session Border Controllers (SBC), Media Gateway Controllers (MGC) and Call Servers (CS)) usually have some inbuilt overload self-protection mechanisms intended to prevent their collapse of processing under overload by discarding messages that request a new session set-up. Most mechanisms have little or no discrimination on the type of calls that are being affected, with emergency calls often receiving the only discrimination in the load shedding process. Whilst protecting itself, this does nothing to maximise the successful establishment of new sessions.

In networks implementing VoIP technology the call control and the media transport are separated into independent media and session control planes. This enables the design of a flat control architecture that allows any node to have a signalling relationship with any other node. With the addition of a centralised routing function this allows for highly scalable and distributed networks but it also leads to scaling issues in large networks when it comes to signalling the appropriate load information of all destination nodes to all the nodes generating the new session set-ups.

For such flat control plane architectures, some schemes have been proposed where an overloaded node responds to requests for new session set-up by signalling that all sending nodes to discard a proportion of its new requests. This scheme has a number of problems.

It either has to hold a configuration of all the sending nodes to which to send the overload control information or respond just to the nodes making the load requests. This means that any new sending nodes will not initially have the restriction information and may start sending at full rate. Also as traffic demand varies, with a very fast rise time, it becomes impractical to match and feedback the proportional discard rate that will produce the optimal traffic demand offered to the overloaded node. If for example a node can receive no more than 100 new session set-ups per second and it anticipates a traffic demand of 200 new session set-ups per second, requesting a 50% discard of traffic will not help if the real traffic rate rises to 1000 new session set-ups per second before the overloaded node can re-evaluate and signal the change in discard rate. Therefore, for nodes to protect themselves within such schemes, they tend to use overly severe restriction predictions which will reduce customer experience through unsuccessful sessions and reduce network revenue below that which could have been achieved with the available resources.

Another technique that is used for overload control is for the node under stress to signal to its neighbour nodes the absolute rate of session set-ups it requires instead a proportional discard as described above. For example, send me no more than 100 new session set-ups per second rather than discard 30% of your new call requests. The advantage of this scheme is that the demand sent can be matched to the available capacity of the overloaded node and be can safely protected regardless of how rapidly the traffic rate may rise. If the sending nodes are well behaved, the demand sent will not exceed the demand requested. The problem with current implementations of this scheme is that the node in question needs to know how to apportion its optimal total target rate for offered traffic amongst all the nodes that can send it traffic. This means that not only does it has to have preconfigured information of the other nodes so it can send each the restriction information of that specific node, but it must also know something of the relative size of the nodes so that some apportionment of fairness can be built in. If 10 source nodes can send traffic to a destination node that decides it needs to limit demand to 100 new session set-ups per second, dividing the traffic limit to 10 new session set-ups per second for each connecting node may suffer from the following problems:

One or more of the nodes may only be able to generate less than 10 new session set-ups per second in total so the total demand at the destination can only be suboptimal, i.e. the destination node will be underutilised.

One or more of the nodes may be able to send much more than 10 new session set-ups per second so the disproportional restriction will be 'unfair' on the user on the node in terms of customer experience.

In mass media events, such as television gaming applications, where 'winners' are selected from the calls arriving at the destination; callers from the disproportionately restricted nodes are disadvantaged.

US patent application 20100220587 discloses a method for implementing a two throttle overload control architecture in a node, one throttle on the input and one on the output side of the node. The in-throttle filters the input traffic according to the perceived limits of the target nodes' processing capacities. This allows requests that would be dropped by the target nodes due to overload to be filtered prior to being processed by the node. In addition, filter weights for the in-throttle is set such that the possibility of admitting to-be-dropped requests is minimized. The purpose of the method is thus to protect the node itself from having to process traffic that will anyway later be dropped. The disadvantage of this method is that each target node has to report its capacity to every possible source node and a source node cannot filter requests to targets it is not in direct contact with.

Patent application EP2445164 describes a method for load balancing between call session control functions (CSCF) in order to overcome the problem of a registration storm when a large number of user terminals try to reconnect for a service. Each CSCF reports its load, or rather the number of users currently registered to it, to a centralised DNS server which then uses the information for load balancing SIP registration requests between available CSCFs. This system is, however, only relevant for the process of SIP registering, that is user equipment must register with a CSCF upon connecting to a network. However, once the user equipment is registered to one of the CSCFs it remains associated with this node. Thus, this method does not provide a solution to the problem of avoiding call setups to overloaded session control edge nodes on a call by call basis.

SUMMARY OF INVENTION

According to a first aspect of the present invention there is provided a method for optimising session set-up between session control nodes, which nodes interface to different networks and/or end user terminals in a globally scalable VoIP network, said method comprising at a centralised server system:
receiving a load status message indicating a load status from each session control node;
receiving session set-up requests from said session control nodes where each session set-up request identifies a sender node and a destination node and determining from said requests the number of session set-up requests directed to each destination session control node;
for each received session set-up request selecting one or more session set-up policies to include in a response to the requesting session control node based on said indicated load status and the number of session set-up requests directed to each session control node; and
sending the one or more selected session setup policies to the requesting session control node.

By enabling a central server to determine the number of session set-up requests directed to each node as well as load restriction requirements for the session control node, a more efficient load balancing between the different session control nodes can be achieved, thus avoiding or reducing the risk both of over-loading and under-loading the nodes. A further advantage is that each destination node only needs to communicate its load status updates to one location, therefore in a network of n destination nodes, each node would only need to be aware of one centralised overload control server and would generate only one message for each status update, thus reducing the management complexity and the communication effort required when experiencing overload at the destination node, as well as reducing the signalling traffic on the network.

Preferably, the load status message comprises a request for a defined restriction on new session set-ups per second or a request for a proportional discard. However, other target load information could be conveyed.

According to a second aspect of the invention there is provided a server system for controlling session setup between session control nodes, which nodes interface to different networks and/or end user terminals in a globally scalable VoIP network, said server system comprising:
a session setup policy module arranged in operation to select one or more session setup policies in response to session setup requests received from said session control nodes, where each session setup request identifies a sender node and a destination node;
an overload control module arranged in operation to receive from each session control node a load status message indicating a load status;
the server system being further arranged in operation to determine from said received session setup requests the number of session set-up requests directed to each session control node, and to select one or more session setup policies to include in a response to a requesting session control node based on said received load status and the number of session set-up requests directed to each session control node.

Figure 2:
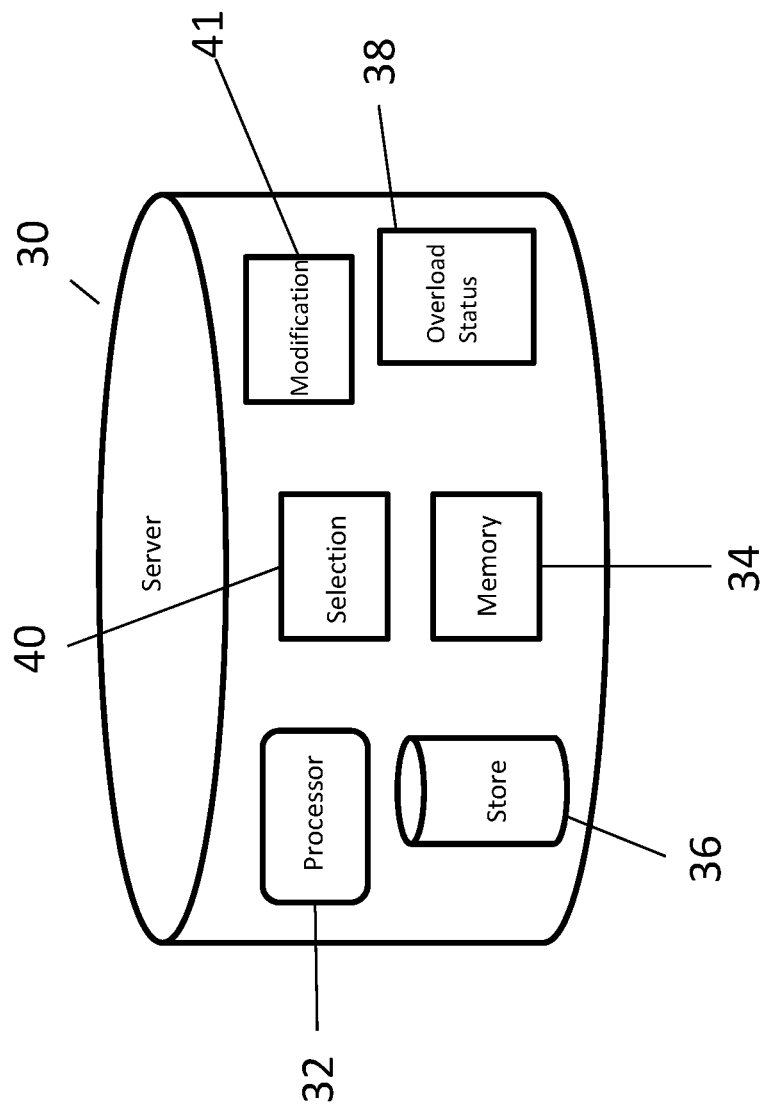
Figure 3:
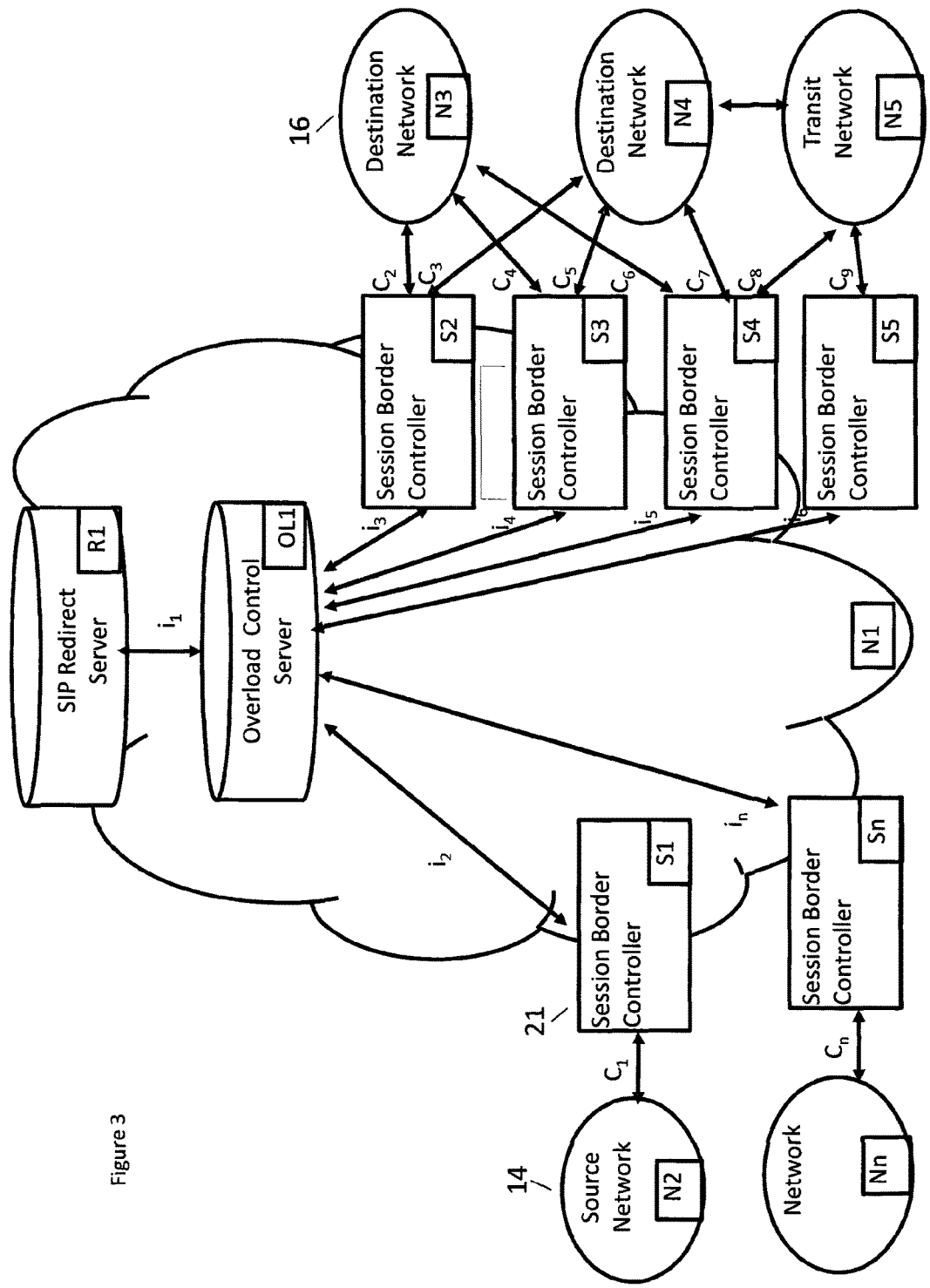
Figure 4:
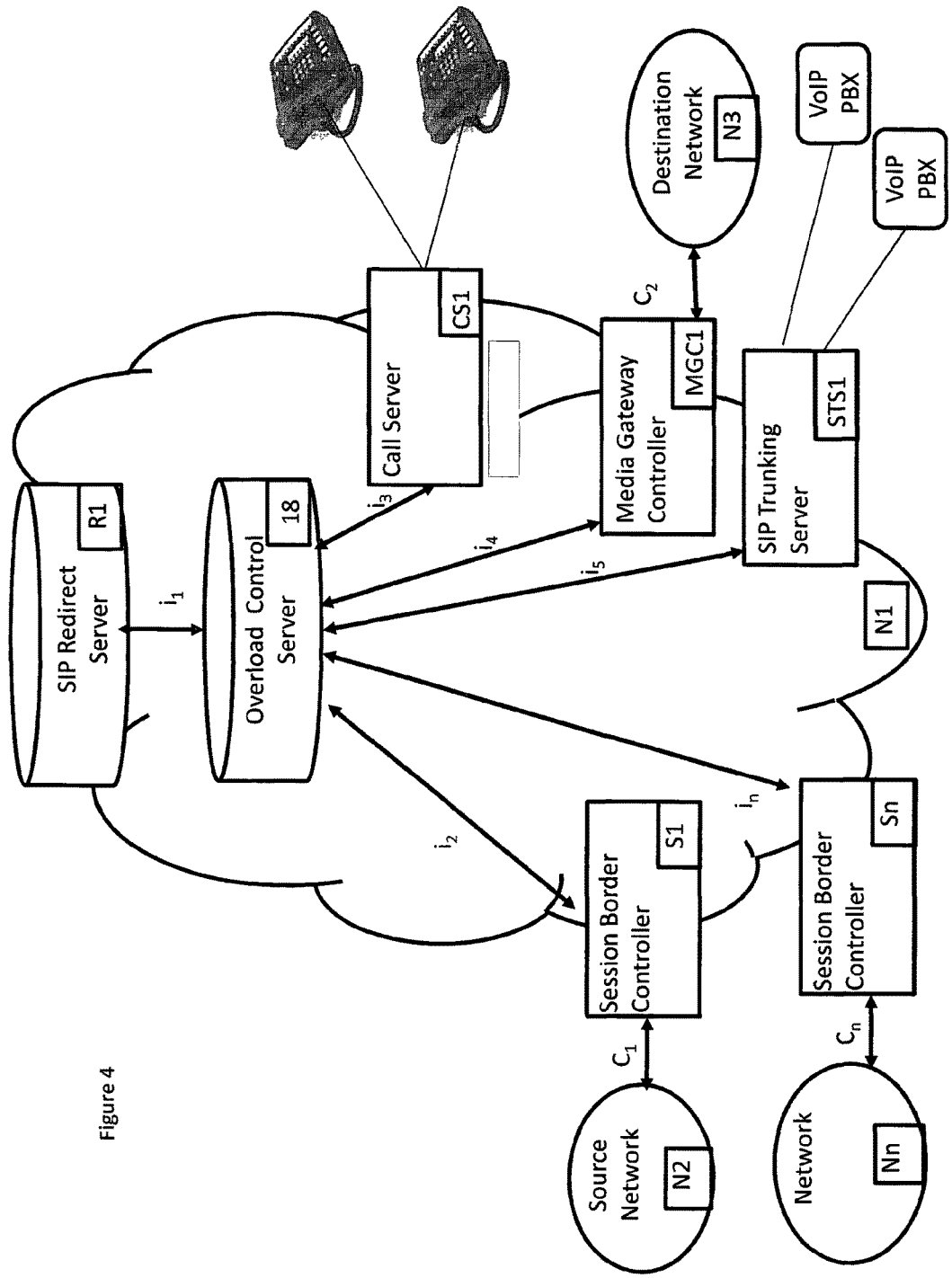

Embodiments of the invention will now be described, by way of example, with reference to the accompanying drawings in which:

FIG. 1 shows an exemplary embodiment of a system implementing centralised overload control.
FIG. 2 shows an exemplary embodiment of a centralised server.
FIG. 3 shows an exemplary embodiment of an alternative configuration where a centralised overload control server acts as a proxy to a policy server.
FIG. 4 shows an example implementation of the invention in an IP Transit network using SIP signalling.

DESCRIPTION OF PREFERRED EMBODIMENTS

A system in which a first exemplary embodiment of the present invention is implemented will now be described in relation to FIG. 1. The voice and multimedia network 20 of FIG. 1 is a large transit network where many different network operators interconnect. The network 20 comprises a number of session control edge nodes 21A-D, which terminate the interconnection transmission to different operators, and a centralised session set-up policy server 12. The session set-up policy server 12 comprises a processor 32, a session set-up policy store 36, a selection module 40 and a modification module 41, and one or more memories 33. A session set-up policy comprises an address of a destination session control node and preferably associated trunk group identifiers. The modification module 41 is arranged to filter or discard policies selected by the selection module 40 based on a current overload status and demand for a certain destination session control node.

The edge nodes 21 can be for example Session Border Controllers, Call Servers, Soft switches, Application Servers, Application Gateways, Media Gateways Controllers and Call State Control Functions defined in the Internet Protocol Multimedia Subsystem (IMS) architecture.

In addition, there is a logical centralised overload control server 18 incorporated into the network. The centralised overload control server 18 comprises a processor 37, one or more memories 39, a session control node overload status module 38, a store 42 and for certain embodiments also a modification module 41. This centralised server 18 may be logical, being realised as a number of distributed servers acting as one, or may be imbedded into the functionality of the centralised session set-up policy server 12.

The session control edge nodes 21 are configured to send status messages 22 indicating overload to the centralised overload control server 18. The overload server acknowledges the overload messages by sending responses 24 to the session control nodes. The overload status messages can be sent at regular intervals and/or sent when a session control edge node experiences overload or approaches an overload threshold. The status messages may periodically be refreshed and/or have a 'validity timeout' attached to it. The status message comprises a required overload restriction, for example that the session control node 21A-D requires an offered load of X session set-ups per second, or that a percentage of the traffic to the node needs to be dropped. The session control nodes determine their load status by determining the processor load, i.e. CPU occupancy or software message queue lengths. The required overload restriction for each edge node is stored in the store 42.

Each session control edge node can be configured with the address of the centralised overload control server 18, for example as a DNS fully qualified domain name (FQDN). The edge nodes 21A-D comprise a message generating module 23 (only one shown in the figure) arranged in operation to send overload messages 22 at regular intervals, or due to a sudden load increase, to the session control edge node overload status module 38 in the overload control server 18, which stores the address of each edge node in the memory 39 as well as information about any interconnects associated with the edge node. Alternatively, when a new session control edge node 21 is added to the network 20 its identity, e.g. IP address or SIP URI, is added to the memory 39 of the centralised overload control server 18 which initially probes the node for overload status messages.

The overload control server 18 is configured to inform or update 3 the session set-up policy server 12 of any overload restrictions required by the session edge nodes 21A-D via a management interface, not shown in FIG. 1. The session set-up policy server 12 stores in the store 36 session set-up policies governing which destination edge node 21A-D a source edge node 21A-D should preferable use in order to reach the destination network or end user 16 as well as which alternative edge nodes to use and in which order. The session set-up policy server receives session set-up requests 4 from all source session control edge devices 21 and therefor it can determine the total traffic, i.e. the number of session set-ups, intended for each destination session control node. The session set-up policies are static but based on the overload restriction requirements received from the overload control server 18 and the number of session set-up requests intended for the session control node, the modification module 41 is configured to filter out any session set-up policies received from the selection module 40 which rely on an overloaded session control edge node 21A-D and/or one or more connections to a downstream network connection, controlled by one of the session control edge nodes, and indicated as overloaded in the load status messages from said session control edge node. If a session control edge node has signalled to the centralised overload control server that it is overloaded and requires a maximum load of X session set-ups per second, the modification module 41 is configured to set a rate limiter (leaky bucket) that monitors initial session set-up responses from selection module 40 to requesting sources. If the primary session set-up choice is via the node which has requested the maximum load of X session set-ups per second and if directing the source node to establish a session to said node would cause the set-up rate to exceed the set-up rate requested by the node, the modification module 41 will remove it from the session set-up choices sent to the source nodes in a response 6, thus ensuring the destination does not receive set-ups that would exceed that rate. The total traffic offered to that destination will be pegged at X session set-ups per second. The source node 21A then routs 7 the session set up to the destination session control node 21D, which forwards 8 the session set up to the network or end user 16.

Once a message is received indicating that an edge node is no longer overloaded or have more or less stringent overload requirements, the overload control server informs the policy server so it can adjust any restrictions when that edge node is selected as an option in its routing decisions.

If the session set-up policy server receives a sudden increase of requests directed to a specific end user the modification module will select the session set-up policies to include in each response such that the load is distributed between alternative destination session control nodes, i.e. directing some requesting control nodes to the primary destination session control node and the remainder to other destination session control nodes in accordance with their load status and indicated session set-up restrictions.

If received status messages indicate that a destination session control node is not overloaded and does not require session setup restriction, the modification module will not modify or filter the session set-up policies. If a destination session control node is overloaded and requests via status messages for session set-up restrictions to be applied, the modification module will modify the set of session set-up policies to include in the response so that the number of session set-up requests directed to said overloaded node is restricted by the requested amount.

In an alternative embodiment the functionality of the centralised overload control server and the centralised session set-up policy server are implemented in one, single, logical server 30. FIG. 2 shows such a server 30 comprising a processor 32, a memory 34, a store 36 for storing session set-up policies, an overload status module 38, a policy selection module 40 and a modification module 41. The overload status module 38, policy selection module 40 and modification module 41 are preferably implemented as program code which when loaded into the memory 34 and executed by the processor 32 performs the different steps for optimising the session set-up with respect to overload status of edge nodes in the application layer.

If the centralised policy server 12 does not have the capability to filter or modify the session set-up policies the centralised overload control server 18 can act as a proxy for the session set-up requests and filter or modify the session set-up policies received from the policy server before forwarding them to the requesting session edge nodes 21A-D. In this alternative embodiment the modification module 41 is arranged in the overload control server 18.

With reference to FIG. 3 an embodiment in which the centralised overload control server 18 acts as a proxy for the session set-up requests is now described.

A voice and multimedia transit network $N_1$ interconnects a number of other networks $N_2$ to $N_n$ via connections $C_1$ to $C_n$ which are controlled by edge session control devices 21 for session admission and establishment. In this example the edge session control devices 21 are session border controllers (SBCs) S1 to Sn although other devices such as media gateway controllers, soft switches, SIP trunking servers and entities implementing 3GPP IMS Call State Control Functions could also be the edge devices of the network $N_1$. Each SBC S1-Sn sends overload status messages to the Overload Control Server OL1 regarding how new session set-ups should be restricted to it or restricted to one of the connections Ci connected to it. This could be the session set-up rate, e.g. calls per second, or a proportional discard value e.g. 0% to 100%, indicating that a proportion of the new session requests should be discarded (e.g. 33%=discard every $3^{rd}$ call; 20%=every $5^{th}$ call, 50%=every other call, etc.). When a new session set-up is requested by one of the interconnected networks 14, the serving SBC sends session establishment requests to the Overload Control Server which proxies the request to a SIP Redirect Server R1 (corresponding to the policy server 12 in FIG. 1) which examines the information in the session request, for example a called telephone number on a destination network, and decides from that information to which out of one or more SBCs the session set-up should be directed. The possible destination SBCs and interconnections are sent back to the Overload Control Server as session set-up policies from the SIP Redirect Server R1 in a priority order. The Overload Control Server examines the first priority policy against any overload restriction criteria signalled by the corresponding destination SBC. If the first policy passes the restriction criteria, all the session set-up policies are returned to the requesting SBC unaltered. If the first policy fails the restriction criteria, it is removed from the policy options and the second session set-up policy is tested against the restriction criteria signalled by the corresponding destination SBC. If this test passes, this and the remaining session set-up policies are returned to the requesting SBC else it is also removed from the policies options and next policy is tested. This recursive process continues until one of the session set-up policies passes its associated restriction criteria or the session set-up policy list is exhausted. If policy list is exhausted, the Overload Control Server sends a set-up rejection message to the requesting SBC.

In an extension to this described case, the destinations edge devices do not only communicate the overload status/target session set-up demand for themselves but can also include a report on the status of connections to other networks.

With further reference to FIG. 3 an embodiment including this expansion of the general description above will now be described. In this example each connection $C_1$ to $Cn$, between the network N1 and the other networks N2 to Nn, is assumed to be identified by a SIP trunk group as defined in RFC 4904 [2].

The example further uses SIP as the signalling protocol as defined by RFC 3261 [1] to demonstrate the principal of the invention. The SIP messages used are illustrative and for brevity, only the relevant fields in these messages are shown to demonstrate the invention rather than that of a full implementation. The parameters "restrictor-value" and "restrictor-type" are illustrative extensions to SIP contact headers that could be used and are specific to this example, reflecting that different restriction schemes can be applied within the invention. In this example restrictor-type=cps indicates that a 'calls per second' target delivery rate for new session set-up is being requested as opposed to another scheme such as restrictor-type=pd to indicate 'percentage discard' of new sessions requests.

Example of Overload Control Status Message Sequences

Step 1. Each SBC S1 to Sn is configured to send overload restriction messages to the Overload Control Server OL1 at periodic intervals and when there is a significant change in overload status. This can be both for the total processing capacity for the totality of its own processing and/or for some defined processing limit for the connections $C_1$ to Cn it serves to other networks.

Step 2. Each SBC S1 to Sn sends a SIP OPTIONS message to the Overload Control Server, to convey the overload status information in line with the design and configuration options in Step 1. For example, SBC S4 would send the following to the Overload Control Server OL1 to indicate that it was capable of receiving a total of 100 calls per second and that interconnects $C_6$, $C_7$ and $C_8$ could receive 50, 60 and 40 calls per second respectively.

```
OPTIONS sip: OL1.N1.net SIP/2.0
To: OL1.N1.net
  From:S4.N1.net;tag=34678392;restrictor-type=cps; restrictor-value=100
  Contact: sip:S4.N1.net;tgrp=C6;trunk-context=N1.net;
    Restrictor-type=cps; Restrictor-value=50
  Contact: sip:S4.N1.net;tgrp=C7;trunk-context=N1.net;
    Restrictor-type=cps; Restrictor-value=60
  Contact: sip: S4.N1.net;tgrp=C8;trunk-context=N1.net;
    Restrictor-type=cps; Restrictor-value=40
```

Step 3. Either through static configuration or dynamically in response to the first appearance of an OPTIONS message, the Overload Control Server OL1 instantiates a restrictor mechanism (corresponding to the modification module 41 in FIG. 1) for each SBC and each trunk group configured within or reported by the SBC. This restrictor mechanism stores the session set-up restrictor values for each SBC and for the trunk groups associated with the connections Cn that the reporting SBC serves. These restrictor values are updated as each overload OPTIONS message is received. The Overload Control Server acknowledges the OPTIONS message by sending a SIP "200 OK" response to each SBC. When the restrictor mechanism for each SBC and trunk group is set up, it also initialises a store (42 in FIG. 1) for holding the central view of the dynamic session setup behaviour e.g. sessions per second, being established to that SBC and trunk group. In this example, this would be the calls per second for each SBC in totality and each individual trunk group and would be initially set to zero. In this example it is assumed that SBCs S1 to Sn have signalled via OPTIONS messages that they have maximum session rate limits of $sr_1$ to $sr_n$ respectively and in addition SBCs S1 to Sn have also conveyed that there is a session rate limit associated with their connections to other networks $C_1$ to $C_n$ of $cr_1$ to $cr_n$ respectively.

Step 4. New session set-up requests are made via one of more source SBCs, some of which will be destined for the same destination SBC and network interconnect. In this context consider a new session set-up request received from a Source Network (N2) on interconnect ($C_1$) at SBC (S1) as a SIP INVITE request.

```
INVITE sip:+16305550100@S1.N1.net;user=phone SIP/2.0
To: sip:+16305550100@S1.N1.net;user=phone
...
Contact: <sip:source@N2.net; user=phone>
...
```

Step 5, SBC (S1) sends a modified INVITE request with the originating trunk group identifier of the interconnect ($C_1$) to the Overload control server using the same SIP URI as that used for the overload OPTIONS requests ($i_2$).

```
INVITE sip:+16305550100@OL2.N1.net;user=phone SIP/2.0
To: sip:+16305550100@OL2.N1.net;user=phone
...
Contact: <sip:source@S1.N1.net;tgrp=C1;
    trunk-context=N1.net;user=phone>
...
```

Step 6, The Overload Control Server proxies the INVITE request to the SIP Redirect Server (R1) but demands that responses must be returned via itself on interface $i_1$ by adding a SIP Record-Route header

```
INVITE sip: +16305550100@R1.N1.net;user=phone SIP/2.0
To: sip:+16305550100@R1.N1.net;user=phone
...
  Record-Route: <sip:R2.N1.net;lr>
  Contact: <sip:source@S1.N1.net;tgrp=C1;
    trunk-context=N1.net;user=phone>
...
```

Step 7. The SIP Redirect Server (R1) determines that the end user address +16305550100 is served by Destination Network (N4) and would prefer to connect directly via interconnects $C_3$, $C_7$ or $C_5$ but if these are unavailable or congested, to reach network N4 via the Transit Network N5 using interconnects $C_8$ or Cg. The Redirect Server (R1)

therefore constructs a SIP 300 (Multiple Choices) response and sends it to the Overload Control server with a 'priority ordered' list of destination SBC addresses and associated trunk group identifiers for these interconnection routes which are contained in SIP Contact Headers.

```
300 (Multiple Choices)
Route: <sip:R2.N1.net;lr>
Contact: <sip:+16305550100@S2.N1.net;tgrp=C3;
    trunk-context=N1.net;user=phone>
Contact: <sip:+16305550100@S4.N1.net;tgrp=C7;
    trunk-context=N1.net;user=phone>
Contact: <sip:+16305550100@S3.N1.net;tgrp=C5;
    trunk-context=N1.net;user=phone>
Contact: <sip:+16305550100@S4.N1.net;tgrp=C8;
    trunk-context=N1.net;user=phone>
Contact: <sip:+16305550100@S5.N1.net;tgrp=C9;
    trunk-context=N1.net;user=phone>
```

Step 8. The Overload Control Server examines the restriction monitors for the first choice entry in the contacts list for SBC S2 and then the associated trunk group $C_3$.

It first determines if allowing this session set-up would exceed the restrictor value set for the SBC S2 of $sr_2$.

If allowing this session set-up choice would cause that restrictor value to be exceeded then this Contact header

```
Contact: <sip:+16305550100@S2.N1.net;tgrp=C3;
    trunk-context=N1.net;user=phone>
``` is deleted from the list. If the SBC rate value is not exceed the Overload Control Server OL1 examines the restrictor value $cr_3$ for the connection $C_3$, indicated in the trunk group parameter. If this session set-up would cause the value $cr_3$ to be exceeded then this Contact header

```
Contact: <sip:+16305550100@S2.N1.net;tgrp=C3;
    trunk-context=N1.net;user=phone>
``` is deleted from the list.

When a Contact header is deleted from the session set-up destinations list the Overload Control server examines the next Contact header and applies the same logic. In this example if directing the session to be set-up to SBC S2 or connection $C_3$ would exceed the requested restrictor limits then after deleting the contact header the next contact header become the first choice and the restrictor sr4 for SBC 4 is similarly tested followed by the restrictor $cr_7$ for connection $C_7$ if the $sr_4$ restrictor test did not fail.

This process is repeated until a Contact header passes its restrictor test or the Contact header list is exhausted.

No Overload Restrictions are Applied.

Step 9. If in Step 8, the call rate of sending the session set-up to SBC 2 and $C_3$ does not exceed the restrictor rates associated with these two destination entities, the Overload Control Server OL1 updates its record of the session setup behaviour, in this example the calls per second for both SBC S2 and for connection $C_3$.

Step 10. The Overload Control Server OL1, removes the route header in the response received from the SIP Redirect Server R1 and proxies the response to the requesting SBC S1 with the Contact Header list unaltered.

```
300 (Multiple Choices)
Contact: <sip:+16305550100@S2.N1.net;tgrp=C3;
    trunk-context=N1.net;user=phone>
Contact: <sip:+16305550100@S4.N1.net;tgrp=C7;
    trunk-context=N1.net;user=phone>
Contact: <sip:+16305550100@S3.N1.net;tgrp=C5;
    trunk-context=N1.net;user=phone>
Contact: <sip:+16305550100@S4.N1.net;tgrp=C8;
    trunk-context=N1.net;user=phone>
Contact: <sip:+16305550100@S5.N1.net;tgrp=C9;
    trunk-context=N1.net;user=phone>
```

Step 11. On receipt of the 300 (Multiple Choices) message the SBC S1 would use the first Contact header to form an invite to SBC S2 and trunk group $C_3$.

```
INVITE sip:+16305550100@S2.N1.net;tgrp=C3;
    trunk-context=N1.net;user=phone SIP/2.0
To: sip:+16305550100@S2.N1.net;tgrp=C3;
    trunk-context=N1.net;user=phone
...
Contact: <sip:souce@S1.N1.net;tgrp=C1;
    trunk-context=N1.net;user=phone>
```

Step 12. On receipt of the session set-up request, SBC S2 would pass the request to network N4 over connection $C_3$ to complete the set-up.

```
INVITE sip:+16305550100@N4.net;
    trunk-context=N1.net;user=phone SIP/2.0
To: sip:+16305550100@N4.net;
    trunk-context=N1.net;user=phone
...
Contact: <sip:souce@S3.N1.net;
    trunk-context=N1.net;user=phone>
```

Some Overload Restrictions are Applied.

Step 13. Same as Step 4
Step 14. Same as Step 5
Step 15. Same as Step 6
Step 16. Same as Step 7
Step 17. Same as Step 8

Step 18. In this example, in Step 17 if the call rate of sending the session set-up to SBC 2 exceeds the associated restrictors then the first contact header is deleted from the session set-up options list and the Overload Control Server OL1 does not update its record of the session setup behaviour, in this example the calls per second for the SBC S2 nor the Connection $C_3$.

Also in this example, in Step 17 if the call rate of sending the session set-up to connection $C_7$ exceeds the associated restrictors then the second contact header is deleted from the session set-up options list and the Overload Control Server OL1 does not update its record of the session setup behaviour, in this example the calls per second for SBC S4 nor the Connection $C_7$.

Then, in this example, in Step 17, the call rate of sending the session set-up to the destination entities within the third Contact header returned from SIP Redirect Server R1, i.e. SBC 3 and $C_5$ does not exceed the restrictor rates associated with each of them, the Overload Control Server OL1 updates its record of the session setup behaviour, in this example the calls per second for both SBC S3 and for connection $C_5$.

Step 19. The Overload Control Server OL1, removes the route header in the SIP 300 response received from the SIP Redirect Server R1 and proxies the modified response with the deleted Contact headers to the requesting SBC S1.

```
300 (Multiple Choices)
Contact: <sip:+16305550100@S3.N1.net;tgrp=C5;
    trunk-context=N1.net;user=phone>
Contact: <sip:+16305550100@S4.N1.net;tgrp=C8;
    trunk-context=N1.net;user=phone>
Contact: <sip:+16305550100@S5.N1.net;tgrp=C9;
    trunk-context=N1.net;user=phone>
```

Step 20. On receipt of the 300 (Multiple Choices) message the SBC S1 would use the first Contact header in the now modified list to form an INVITE to SBC S3 and trunk group $C_5$.

```
INVITE sip:+16305550100@S3.N1.net;tgrp=C5;
    trunk-context=N1.net;user=phone SIP/2.0
To: sip:+16305550100@S3.N1.net;tgrp=C5;
    trunk-context=N1.net;user=phone
...
Contact: <sip:souce@S1.N1.net;tgrp=C1;
    trunk-context=N1.net;user=phone>
```

Step 21. On receipt of the session set-up request, SBC S3 would pass the request to network N4 over connection $C_5$ to complete the set-up.

```
INVITE sip:+16305550100@N4.net;
    trunk-context=N1.net;user=phone SIP/2.0
To: sip:+16305550100@N4.net;
    trunk-context=N1.net;user=phone
...
Contact: <sip:souce@S3.N1.net;
    trunk-context=N1.net;user=phone>
```

Overload Restrictions are Applied to all Destination Choices.

Step 22. Same as Step 4
Step 23. Same as Step 5
Step 24. Same as Step 6
Step 25. Same as Step 7
Step 26. Same as Step 8
Step 27. If none of the session set-up choices in the Contact header list pass their respective restrictor tests, the Overload Control Server OL1 returns a SIP response to SBC S1 to reject the session setup request.
503 Service Unavailable
Step 28. SBC S1 passes the reject response to the originating network
503 Service Unavailable
which in turn signals back to the source and the session establishment is abandoned.

Examples of Further Applications and Extensions

With reference to FIG. 4 a further embodiment where other possible destination entities to which a SIP Redirect Server R1 could send calls to are shown. The could be for example:
  a) a call server CS1 to which a number of end users are registered
  b) a Media Gateway Controller MGC1 that signals to a Network N3 via connection $C_3$ and not using SIP, e.g. Signalling System 7 or
  c) a SIP Trunking Server STS1 providing IP connectivity to VoIP PBXs.

In this example the overload status message sent from these destination entities via SIP OPTIONS messages could include an extension to the Contact Header to set and change a restrictor in the centralised overload server for the destination entity itself e.g. CS1, MGC1 and SC1, but also for the destination address, e.g. called telephone number, it serves. This could be for single numbers, ranges of numbers and SIP URIs. For example:—

```
OPTIONS sip:OL1.N1.net SIP/2.0
To: OL1.N1.net
From: CS1.N1.net;tag=34678392;restrictor=100;restrictor-type=cps
Contact: sip:CS1.N1.net;Restrictor-type=cps; Restrictor-value=50;
    Restrictor-adrs=+16305550100; Restrictor-adrs-type=E164
Contact: sip:CS1.N1.net;Restrictor-type=cps; Restrictor-value=60;
    Restrictor-adrs=+16307770100-+16307770199;
    Restrictor-adrs-type=E164-range
Contact: sip:CS1.N1.net;Restrictor-type=cps; Restrictor-value=40;
    Restrictor-adrs=fred.blogs@N1.net;
    Restrictor-adrs-type=SIP-URI
```

The restrictors associated with destination addresses are envisaged as being dynamically created in the Overload Control Server on receipt of the first OPTIONS message that referenced it and would be removed after an expiry period when updates via subsequent OPTIONS messages for that destination address were not received by a specific cancellation update.

Exemplary embodiments of the invention are realised, at least in part, by executable computer program code which may be embodied in application program data provided by the program modules in the Centralised overload control server 18 and Centralised session set-up policy server 12. When such computer program code is loaded into the memory of each server for execution by the respective processor, it provides a computer program code structure which is capable of performing at least part of the methods in accordance with the above described exemplary embodiments of the invention.

Furthermore, a person skilled in the art will appreciate that the computer program structure referred can correspond to the process flow shown in FIGS. 1, 3 and 4 where each step of the processes can correspond to at least one line of computer program code and that such, in combination with the processor in respective server, provides apparatuses for effecting the described process.

The above embodiments are to be understood as illustrative examples of the invention. Further embodiments of the invention are envisaged. For example, the modules or part of the modules for effecting the described process can be implemented in hardware or a combination of hardware and software.

Further, the session set-up policies stored in the server system could instead of being excluded by the selection module based on the overload status messages received from the session control edge nodes be modified or amended to avoid session set-up recommendations to overloaded destination session control edge nodes or their interconnects.

In summary, a centralised server system is arranged to monitor overload restriction requirements of session control nodes within a globally scalable VoIP and Multimedia network in order to handle session set-up requests. An overload status module in the server system receives overload status messages from the session control nodes and based on these messages and the demand on each session control node determined from session set-up requests, the server system selects which session control nodes as well as which of their associated interconnects to other networks to include in a session setup response to a session setup request from a source session control node.

REFERENCES

[1] RFC 3261 SIP: Session Initiation Protocol, Internet Engineering Task Force
[2] RFC 4904 Representing Trunk Groups in tel/sip Uniform Resource Identifiers (URIs), Internet Engineering Task Force

The invention claimed is:

1. A method for optimising session set-up between session control nodes, which nodes interface to different operator networks in a globally scalable VoIP network, said method comprising at a centralised server system:
   receiving a load status message indicating a load status from each session control node and storing the load status for each session control node, said load status messages comprising a required overload restriction for a session control node;
   receiving a session set-up request from one of said session control nodes where the session set-up request identifies the requesting session control node and a destination entity in the VoIP network;
   receiving a prioritized list of session set-up policies each identifying a destination session control node that the requesting session control node should use in order to reach the destination entity;
   testing a session set-up policy against an overload restriction of the destination session control node to determine if the overload restriction of the destination session control node would be exceeded if the session set-up request is allowed, wherein the overload restriction includes a maximum session set-up rate of the destination session control node so that testing the session set-up policy against the overload restriction of the destination session control node includes determining whether the maximum session set-up rate of the destination session control node would be exceeded if the session set-up request is allowed;
   modifying the prioritized list by, starting with the highest priority session set-up policy, deleting one or more session set-up policies from the list that include a destination session control node that would exceed its overload restriction if the session set-up request is allowed by virtue of a determination that a maximum session set-up rate of that destination session control node would be exceeded if the session set-up request is allowed, until a policy is reached that includes a destination session control node that would not exceed its overload restriction is the session set-up request is allowed; and
   sending the modified list of session setup policies to the requesting session control node.

2. A method according to claim 1 further comprising receiving in said load status message a request for a defined overload restriction on new session setups per second.

3. A method according to claim 2 wherein if by setting up a session from a source node to a destination session control node the setup rate requested by said destination session control node would be exceeded, deleting from the list any session setup policies which direct the source node to said destination session control node.

4. A method according to claim 1 further comprising receiving in said load status message a request for a proportional discard of all new session set-ups.

5. A method according to claim 1 further comprising said session control nodes sending the load status message upon approaching an overload restriction threshold.

6. A method according to claim 1 wherein said load status message received from each session control node comprises an overload status of the node and an overload status of any associated trunk connections to other networks.

7. A method according to claim 1 further comprising reinstating one of the session control nodes and/or a connection as selectable options in a session setup policy decision upon said one of the session control nodes indicating no overload in a new load status message.

8. A method according to claim 1 further comprising storing an overload status table in the server system indicating an overload status and an overload restriction criteria for each session control node and an overload status and an overload restriction criteria for their associated trunk connections to other networks.

9. A server system for controlling session setup between session control nodes, which nodes interface to different operator networks in a globally scalable VoIP network, said server system comprising:
   at least one processor for executing instructions stored in at least one storage memory which upon execution configure the server system to at least:
      receive from each session control node a load status message indicating a load status, and store the load status for each session control node, said load status messages comprising a required overload restriction for a session control node;
      receive a session set-up request from one of said session control nodes where the session set-up request identifies the requesting session control node and a destination entity in the VoIP network;
      receive a prioritized list of session set-up policies each identifying a destination session control node that the requesting session control node should use in order to reach the destination entity;
      test a session set-up policy against an overload restriction of the destination session control node to determine if the overload restriction of the destination session control node would be exceeded if the session set-up request is allowed, wherein the overload restriction includes a maximum session set-up rate of the destination session control node so that testing the session set-up policy against the overload restriction of the destination session control node includes a determination of whether the maximum session set-up rate of the destination session control node would be exceeded if the session set-up request is allowed;
      modify the prioritized list by, starting with the highest priority session set-up policy, deleting one or more session set-up policies from the list that include a destination session control node that would exceed its overload restriction if the session set-up request is allowed by virtue of a determination that a maximum session set-up rate of that destination session control node would be exceeded if the session set-up request is allowed, until a policy is reached that includes a destination session control node that would not exceed its overload restriction is the session set-up request is allowed; and
      send the modified list of session setup policies to the requesting session control node.

10. A server system according to claim 9 in which the server system is arranged in operation to store an overload status table indicating an overload status and an overload restriction criteria for each session control node and an overload status and an overload restriction criteria for their associated trunk connections to other networks.

11. A server system according to claim 9 in which the functionality of the server system is distributed in one or more session set-up policy servers and overload status servers communicating with each other via one or more management interfaces.

12. A server system according to claim 11 in which the overload status server is configured as a proxy server for the session set-up policy server.

13. A server system according to claim 9 in which the session control nodes are Session Border Controllers, Call Servers, Softswitches, Application Gateways, Media Gateways controllers or Call State Control Functions in an IMS network.

14. A non-transitory computer readable storage medium storing a computer program or a suite of computer programs executable to perform the method according to claim 1.

15. The method according to claim 1 further comprising sending the prioritized list, unaltered, to the requesting session control node if the highest priority session set-up policy includes a destination session control node that would not have its overload restriction exceeded if the session set-up request is allowed.

16. The server system according to claim 9, wherein the server system is further configure to send the prioritized list, unaltered, to the requesting session control node if the highest priority session set-up policy includes a destination session control node that would not have its overload restriction exceeded if the session set-up request is allowed.

17. The method according to claim 1 further comprising sending a set-up rejection message to the requesting session control node if each session set-up policy on the prioritized list includes a destination session control node that would have its overload restriction exceeded if the session set-up request is allowed.

18. The server system according to claim 9, wherein the server system is further configure to send a set-up rejection message to the requesting session control node if each session set-up policy on the prioritized list includes a destination session control node that would have its overload restriction exceeded if the session set-up request is allowed.

\* \* \* \* \*